I. C. POPPER.
GRILL STOVE.
APPLICATION FILED MAY 8, 1920.

1,351,682.

Patented Aug. 31, 1920.
3 SHEETS—SHEET 1.

Witness

Inventor
Isaac C. Popper
By Vernon E. Hodges
his Attorney

I. C. POPPER.
GRILL STOVE.
APPLICATION FILED MAY 8, 1920.

1,351,682.

Patented Aug. 31, 1920.
3 SHEETS—SHEET 3.

Witness

Inventor
Isaac C. Popper
By
Attorney

UNITED STATES PATENT OFFICE.

ISAAC C. POPPER, OF NEW YORK, N. Y., ASSIGNOR TO THE THEROZ COMPANY, OF NEW YORK, N. Y., A CORPORATION OF DELAWARE.

GRILL-STOVE.

1,351,682.  Specification of Letters Patent.  Patented Aug. 31, 1920.

Application filed May 8, 1920. Serial No. 379,862.

*To all whom it may concern:*

Be it known that I, ISAAC C. POPPER, a citizen of the United States, residing at New York city, in the county of New York and State of New York, have invented certain new and useful Improvements in Grill-Stoves, of which the following is a specification.

My invention relates to an improvement in grill stoves.

The object of this invention is to provide an improved appliance more especially adapted for cooking meats where the stove is in motion, as for example in a dining or buffet-car, and where a strong draft of air has to be dealt with, which, if not under control, is liable to cause trouble by blowing out the flame, all of which considerations I have in view in this particular form of grill stove.

This invention comprises a stove frame, the ends and back of which are perforated, and the front of which is open, a sliding rack which carries the removable grills, and drawers constructed and adapted to slide into the bottom of the grill stove and hold in place the fuel, which may be solidified alcohol or in fact any form of combustible material, together with means for retaining the sliding rack and drawers in place.

Figure 1:
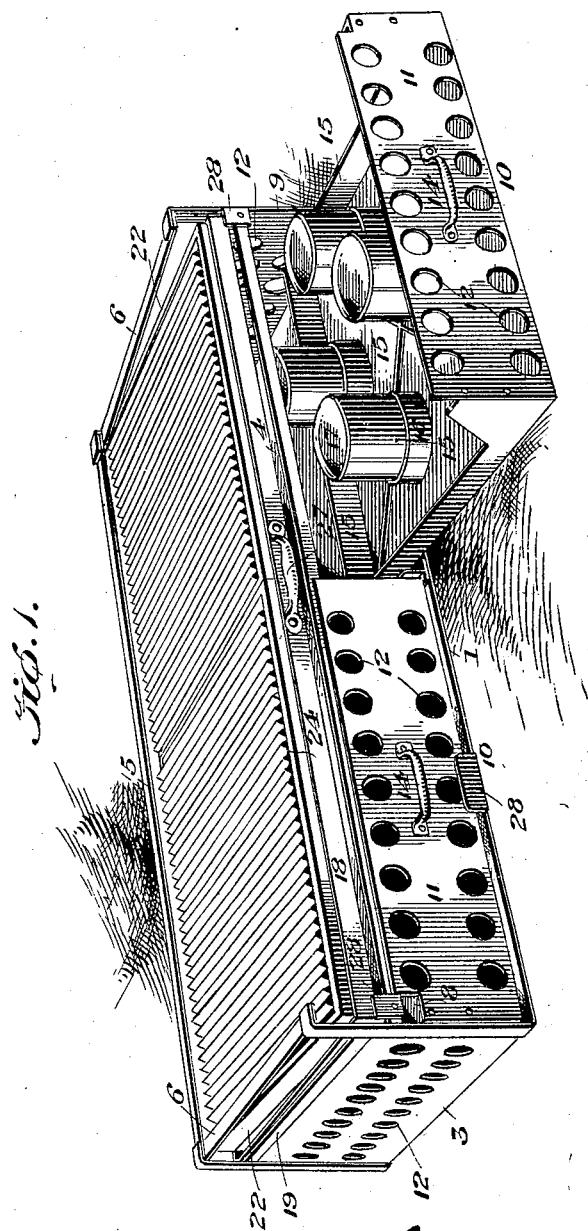
Figure 1 is a view in perspective of the entire grill stove.
Figure 2:
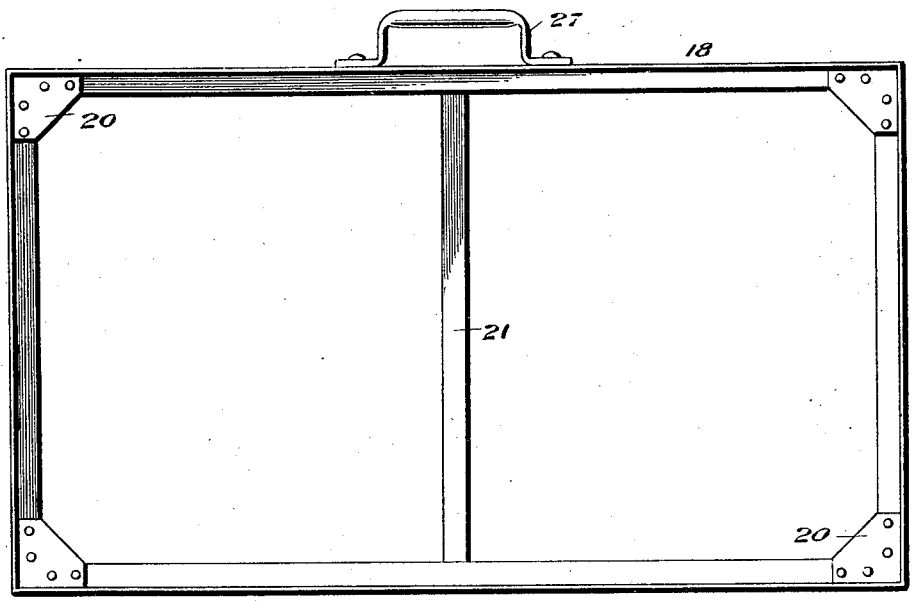
Fig. 2 is a view of the rack.
Figure 5:
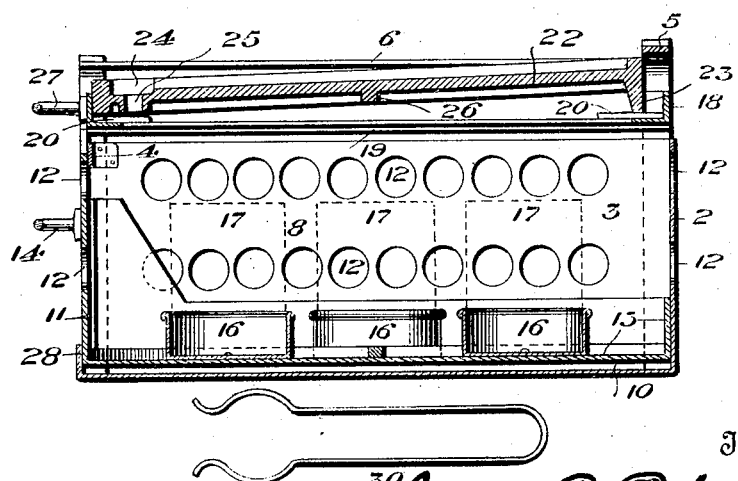
Fig. 5 is a transverse section.
Figure 3:
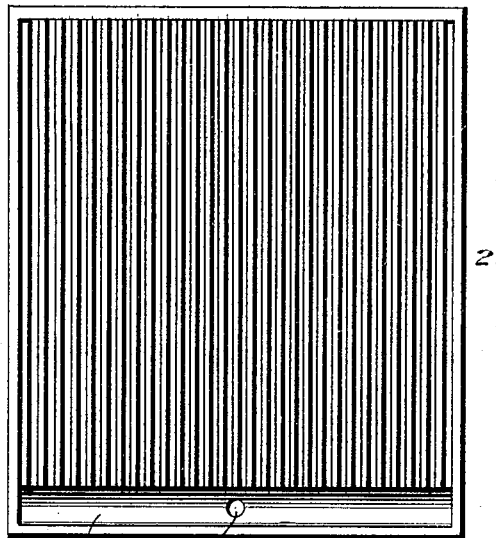
Figs. 3 and 4 are top and bottom views respectively of the grills.
Figure 4:
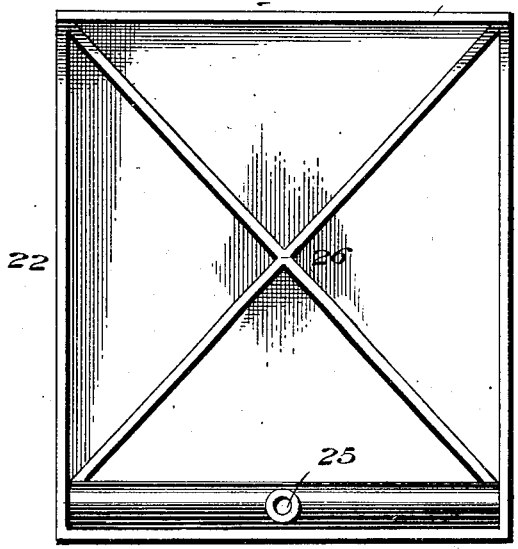

The stove is made of sheet metal and includes a bottom 1, a back 2, the sides or ends 3, front cross-bar 4, connected brace-rod 5 across the top at the rear, and overhanging rails 6 at each end.

The front is open and preferably divided through the center into two spaces 8 and 9, and the drawers 10, (of which there are two in the size of grill illustrated) are adapted to slide into these two openings 8 and 9.

The rear 2, the ends or sides 3, and the fronts 11, 11, of the drawers have perforations 12 for the circulation of air and the products of combustion. Each drawer is provided with a handle 14, for convenience in pushing it in and pulling it out. The drawers comprise a bottom, side and end flanges 15, a perforated front 11, and each drawer is preferably provided with sockets 16 to receive cans or other burners 17 of fuel, such as solidified alcohol or the like, the sockets being distributed around the bottom of the drawer, so that the heat from the cans or burners or other fuel will be applied to the grills above as nearly uniformly as possible.

A skeleton rack 18 is arranged to slide on guides 19 at the sides of the stove. This skeleton rack is preferably in the form of an angle-iron frame having the braces 20 at the corners, and the cross-bar 21 at the center adapted to receive the grills 22. These grills are made to fit side by side in this rack frame, and by reason of the flanged angle-iron edges they are held from slipping. The grills are corrugated on their upper surfaces and are arranged to slope downwardly toward the front having each a depending flange 23 at the upper edge which rests upon the rack and gives the desired inclination to the grill. A groove 24 is formed at the lower edge to which the corrugations lead, and this is provided with an outlet 25 at the center to let the juice out. To give strength to the grill, it has the X-shape angle rib 26 on its bottom.

The overhanging rails 6 at the ends prevent the grills from lifting or being lifted out.

The grill frame has a handle 27 by which it is slid in and out, and its forward end lifted and lowered.

As a means for holding the grill rack and the drawers in position when in place, and also for supporting them against sagging when pulled out, the upstanding lugs 28 are provided. In order to slide the rack and drawers outwardly, they are first lifted over these lugs, and then slid out or in on top of them as supports and guides, and when lifted out, their weight is supported by these lugs. When slid back into position, they are pushed over the lugs back of which they drop when in place, where they are held against working or sliding out of place.

A handle 30 is provided for lifting the cans of fuel, especially when hot.

In this way, I have provided a simple and compact means for cooking various articles, such as steaks, chops, ham, bacon, toast, and the like, and actual demonstration has shown its superiority over old methods now in use in which charcoal is used as the fuel, thus overcoming the many objections incident thereto, such as dirt, slowness of operation, inconvenience in carrying the fuel, and the like, it being the design of the present invention to use prepared fuel, such as solidified alcohol, although I do not by any means confine myself in any way to the fuel.

I claim:

1. A grill stove including a body portion having perforated walls, guides at opposite sides, and an open front, a sliding grill rack, sliding drawers adapted to fit and be slid in the guides and openings, and rigid lugs for holding the rack and drawers in position when slid into place, and for guiding and supporting them when pulled out of their normal position.

2. A grill stove including a body portion having perforated back and ends or sides, a cross-bar at the front, and having openings beneath the cross-bar, drawers having perforated fronts, said drawers slidable in and out of said openings, a grill rack, guides for the latter, and grills removably fitted within the grill rack.

3. A grill stove including a body portion having perforated back and ends or sides, a cross-bar at the front, and having openings beneath the cross-bar, drawers having perforated fronts, said drawers slidable in and out of said openings, a grill rack, guides for the latter, grills removably fitted within the grill rack, and upstanding lugs back of which the grill rack and drawers are dropped and held when in closed position and for guiding and supporting said parts when they are slid out of their normal position.

4. In a grill stove, the combination with a stove body having perforated walls, guides at the ends and open front, of drawers slidable in and out of the openings and having sockets therein to receive the fuel, a grill rack slidable in the guides, grills removably supported in the grill rack, said grills having depending flanges at their upper edges to give them a forward slope when in position, and means for draining the meat juice from the grills.

5. In a grill stove, the combination with a body portion having an open front, perforated sides and back, guides and overhanging rails at the ends or sides, of drawers slidable in and out of the open front, a grill rack slidable in the guides and beneath the overhanging rails, grills removably supported in the grill rack, the drawers having sockets therein, and cans of solidified alcohol removably supported in said sockets.

6. In a grill stove, the combination with a body portion having an open front, perforated sides and back, guides and overhanging rails at the ends or sides, of drawers slidable in and out of the open front, a grill rack slidable in the guides and beneath the overhanging rails, grills removably supported in the grill rack, the drawers having sockets therein, cans of solidified alcohol removably supported in said sockets, and rigid lugs projecting upwardly above the bottom of the body portion and above the guides over which the drawers and grill frame are slid, and back of which they are dropped to prevent their moving from their normal position.

In testimony whereof I affix my signature.

ISAAC C. POPPER.